(12) United States Patent
Wang et al.

(10) Patent No.: US 8,259,270 B2
(45) Date of Patent: Sep. 4, 2012

(54) COLOR WASHOUT REDUCING LIQUID CRYSTAL DISPLAY PANEL AND LCD DEVICE USING THE SAME

(75) Inventors: Wen-Chun Wang, Taichung (TW); I-Fang Wang, Changhua County (TW); Ming-Chang Yu, Taichung (TW); Yung-Cheng Chang, Taichung County (TW)

(73) Assignee: Wintek Corporation, Taichung (TW)

( * ) Notice: Subject to any disclaimer, the term of this patent is extended or adjusted under 35 U.S.C. 154(b) by 512 days.

(21) Appl. No.: 12/555,887

(22) Filed: Sep. 9, 2009

(65) Prior Publication Data

US 2010/0060837 A1 Mar. 11, 2010

(30) Foreign Application Priority Data

Sep. 11, 2008 (TW) .............................. 97134934 A

(51) Int. Cl.
*G02F 1/1337* (2006.01)
(52) U.S. Cl. ....................................................... 349/129

(58) Field of Classification Search ................... 349/129
See application file for complete search history.

(56) References Cited

U.S. PATENT DOCUMENTS

| 7,710,523 B2 * | 5/2010 | Nakanishi et al. ............ 349/129 |
| 2009/0002588 A1 * | 1/2009 | Lee et al. ........................ 349/42 |

* cited by examiner

*Primary Examiner* — Wen-Ying P Chen
(74) *Attorney, Agent, or Firm* — Thomas|Kayden

(57) ABSTRACT

A color washout reducing LCD panel including a first substrate, a second substrate and a liquid crystal layer sealed between the first and second substrates is provided. The first substrate includes several thin film transistors (TFTs) arranged in an array and several pixel electrodes each electrically connected to one TFT. Each pixel electrode has a first and a second electrode blocks. The first electrode block has several first slits, wherein a first interval of the first electrode block is perpendicular to the first slits, and a first width of the first electrode block is between any two neighboring first slits. The second electrode block has several second slits, wherein a second interval of the second electrode block is perpendicular to the second slit and not equal to the first interval, and a second width of the second electrode block is between any two neighboring second slits.

16 Claims, 8 Drawing Sheets

COLOR WASHOUT REDUCING LIQUID CRYSTAL DISPLAY PANEL AND LCD DEVICE USING THE SAME

This application claims the benefit of Taiwan application Serial No. 97134934, filed Sep. 11, 2008, the subject matter of which is incorporated herein by reference.

BACKGROUND OF THE INVENTION

1. Field of the Invention

The invention relates in general to a liquid crystal display (LCD) panel and an LCD device using the same, and more particularly to a color washout reducing LCD panel and an LCD device using the same.

2. Description of the Related Art

In recent years, the flat display technology is getting more and more mature, and electronic products using the liquid crystal display (LCD) panel have a high market share already. Of the various types of LCD panel, the vertical alignment (VA) LCD panel is well accepted and most often manufactured by the producers.

Due to the structure of the VA LCD panel, color washout easily occurs to the VA LCD panel when the view angle is large, and makes the displayed image distorted. Particularly, the skin color may be shifted towards light blue or bright white. Therefore, how to resolve the above problem of color washout so as to provide the user with a quality electronic product has become a focus to the manufacturers.

SUMMARY OF THE INVENTION

The invention is directed to a color washout reducing liquid crystal display (LCD) panel and an LCD device using the same. During display, the pixel element generates an effect similar to the effect of overlapping two gamma curves, so as to compensate color washout and improve the display quality.

According to a first aspect of the present invention, a color washout reducing LCD panel including a first substrate, a second substrate and a liquid crystal layer is provided. The liquid crystal layer is sealed between the first and the second substrate which are disposed in parallel. The first substrate includes a plurality of thin film transistors (TFTs) arranged in an array, wherein each TFT is disposed corresponding to a pixel element of the LCD panel. In each pixel element, the first substrate further includes a pixel electrode electrically connected to the TFT, and each pixel electrode has a first electrode block and a second electrode block. The first electrode block has a plurality of first slits, wherein a first interval of the first electrode block is perpendicular to the first slits, and a first width of the first electrode block is between any two neighboring first slits. The second electrode block has a plurality of second slits, wherein a second interval of the second electrode block is perpendicular to the second slits, and a second width of the second electrode block is between any two neighboring second slit. The second interval substantially is not equal to the first interval.

According to a second aspect of the present invention, an LCD device including a LCD panel and a light source module is provided. The light source module is used for providing a light source to the LCD panel. The LCD panel includes a first substrate and a second substrate, wherein a liquid crystal layer is sealed between the first and the second substrates which are disposed in parallel. The first substrate includes a plurality of thin film transistors (TFTs) arranged in an array, wherein each TFT is disposed corresponding to a pixel element of the LCD panel. In each pixel element, the first substrate further includes a pixel electrode electrically connected to the TFT, and each pixel electrode has a first electrode block and a second electrode block. The first electrode block has a plurality of first slits, wherein a first interval of the first electrode block is perpendicular to the first slits, and a first width of the first electrode block is between any two neighboring first slits. The second electrode block has a plurality of second slits, wherein a second interval of the second electrode block is perpendicular to the second slits, and the second electrode block s has a second width between any two neighboring second slit. The second interval substantially is not equal to the first interval.

The invention will become apparent from the following detailed description of the preferred but non-limiting embodiments. The following description is made with reference to the accompanying drawings.

DETAILED DESCRIPTION OF THE INVENTION

According to the color washout reducing liquid crystal display (LCD) panel and the LCD device using the same disclosed in the present embodiment of the invention, each pixel element is divided into two display regions, and in each pixel element, the pixel electrode is designed to have a plurality of slits of different widths and intervals in the two display regions, so that when the pixel electrode is driven by the same voltage, the pixel electrode has different transmittances in the two display regions. Furthermore, the alignment of the liquid crystal molecules can be assisted by suitable design of alignment structures such as protrusions or electrode slits.

In the present embodiment of the invention, the LCD panel includes a first substrate, a second substrate and a liquid crystal layer, wherein the liquid crystal layer is sealed between the first substrate and the second substrate which are disposed in parallel. The first substrate is exemplified by a thin film transistor (TFT) substrate and the second substrate is exemplified by a color filter substrate, but the invention is not limited thereto.

Figure 1:
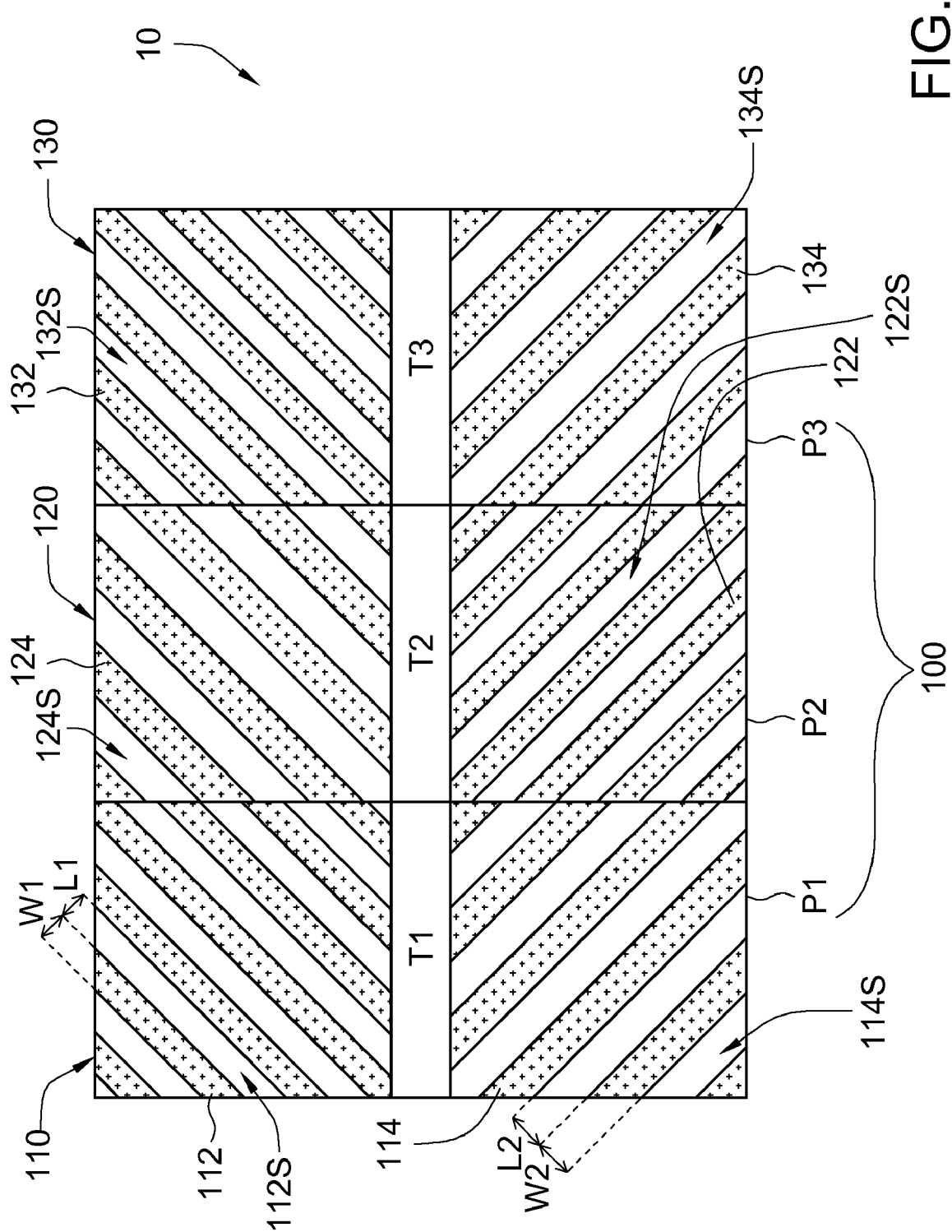
FIG. 1 shows a side view of a first substrate of an LCD panel according to preferred embodiment of the invention.

Referring to FIG. 1, a side view of a first substrate of an LCD panel according to preferred embodiment of the invention is shown. In the LCD panel 10, the first substrate 100 includes a plurality of thin film transistors (TFTs) arranged in an array. Take the TFTs T1~T3 that are disposed at the same row for example, the TFTs T1~T3 respectively are disposed corresponding to the pixel elements P1~P3 of the LCD panel 10. The first substrate 100 further has a plurality of data lines and scan lines (not illustrated), wherein the data lines are disposed in the first substrate 100 along the vertical edge of the pixel elements P1~P3 and are electrically connected to the TFTs T1~T3, while the scan lines are horizontally disposed along the disposition region of the TFTs of the pixel elements P1~P3.

In the first substrate 100, the pixel elements P1~P3 further include the pixel electrodes 110~130 electrically connected to the TFTs T1~T3 respectively, wherein the pixel electrode 110 has a first electrode block 112 and a second electrode block 114, the pixel electrode 120 has a first electrode block 122 and a second electrode block 124, and the pixel electrode 130 has a first electrode block 132 and a second electrode block 134. The first electrode blocks 112, 122 and 132 and the second electrode blocks 114, 124 and 134 are respectively disposed at the two sides of the TFTs T1~T3. Each of the first electrode blocks 112, 122 and 132 has a plurality of first slits 112S, 122S and 132S, and each of the second electrode blocks 114, 124 and 134 has a plurality of second slits 114S, 124S and 134S. A first interval L1 of the first electrode blocks 112, 122 and 132 is perpendicular to each of the first slits 112S, 122S and 132S, and a first width W1 of the first electrode blocks 112, 122 and 132 is between any neighboring two of the first slits 112S, 122S and 132S. A second interval L2 of the second electrode blocks 114, 124 and 134 is perpendicular to the second slits 114S, 124S and 134S, and a second width W2 of the second electrode blocks 114, 124 and 134 is between any neighboring two of the second slits 114S, 124S and 134S. Wherein the second interval L2 is not equal to the first interval L1, so that the light transmittance of the first electrode blocks 112, 122 and 132 is different from that of the second electrode blocks 114, 124 and 134.

When the second width W2 is not equal to the first width W1, the light transmittance of the first electrode blocks 112, 122 and 132 is also different from that of the second electrode blocks 114, 124 and 134. As the width or interval of the first electrode blocks 112, 122 and 132 is different that of the second electrode blocks 114, 124 and 134, preferably, the first electrode block of a pixel element is disposed corresponding to the second electrode block of a neighboring pixel element. That is, the first electrode blocks and the second electrode blocks are alternately disposed on the first substrate 100. As indicated in FIG. 1, the two sides of the first electrode block 122 respectively are the second electrode blocks 114 and 134, and the two sides of the second electrode block 124 respectively are the first electrode blocks 112 and 132.

Figure 2:
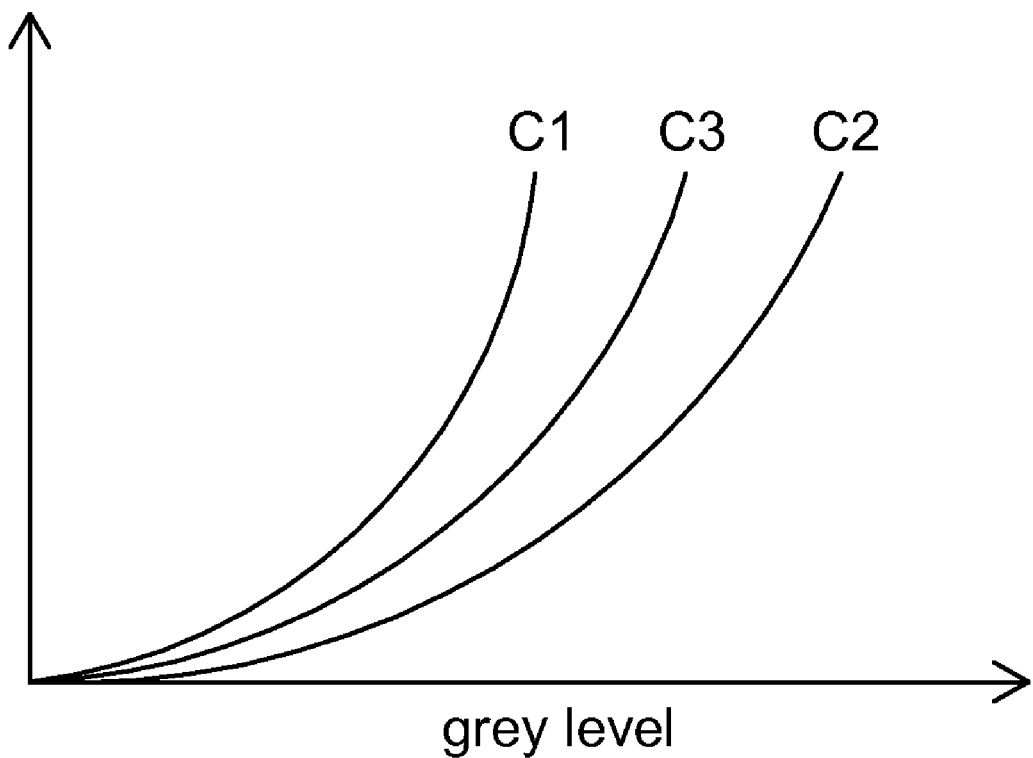
FIG. 2 shows a singular pixel element generating two types of gamma curve for reducing color washout.

Despite one pixel element being divided into two display regions, the first pixel block and the second pixel block both are controlled by the same TFT, and receive the same driving voltage. As the first electrode block and the second electrode block have different widths or intervals, the two display blocks will generate different transmittances when driven by the same common electrode driving voltage. Thus, one pixel element has two types of gamma curves. Referring to FIG. 2, a singular pixel element generating two types of gamma curve for reducing color washout is shown. The gamma curve of the display region corresponding to the first pixel block is exemplified by the curve C1, the gamma curve of the display region corresponding to the second pixel block is exemplified by the curve C2. As indicated by the curve C3, which is obtained by overlapping the curves C1 and C2, the pixel structure of the above design indeed has the effect of gamma curve adjustment.

Also, as the first electrode blocks and the second electrode blocks of two neighboring pixel elements are alternated, the orientation of the liquid crystal director is symmetrically compensated in four directions to avoid the line defects occurring due to the large difference in transmittance when the first electrode blocks and the second electrode blocks have different intervals or widths.

Figure 3A:
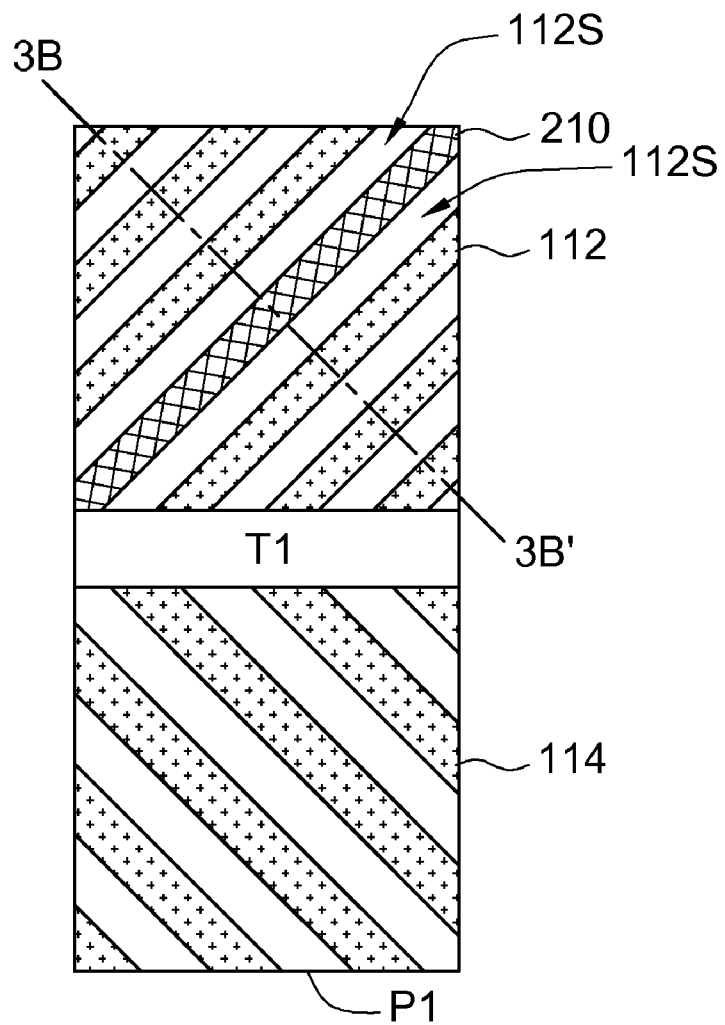
FIG. 3A shows a pixel element disposed with one protrusion.
Figure 3B:
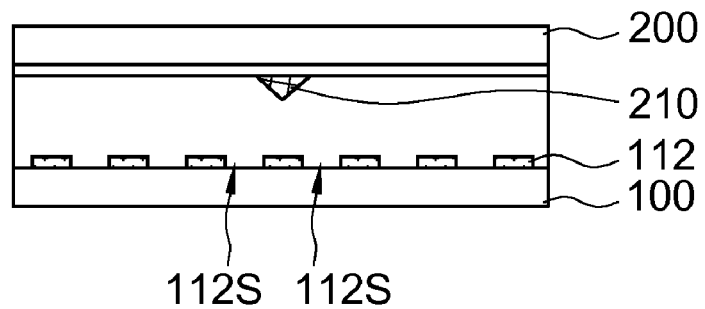
FIG. 3B shows a cross-sectional view of the pixel element of FIG. 3A along a cross-sectional line 3B-3B'.

In the LCD panel 10, the second substrate can further has a plurality of alignment structures, such as protrusions or electrode slits, cooperating with the first slits and the second slits. In the present embodiment, the alignment structures are protrusions for example. Refer to FIGS. 3A and 3B. FIG. 3A shows a pixel element disposed with one protrusion. FIG. 3B shows a cross-sectional view of the pixel element of FIG. 3A along a cross-sectional line 3B-3B'. Let the pixel element P1 be taken for example. A protrusion 210 can be disposed on the second substrate 200 being opposite to the first substrate 100, wherein the protrusion 210 is disposed corresponding to the first electrode block 112 of the pixel element P1 to assist the alignment of the liquid crystal molecules at the center of the display block corresponding to the first electrode block 112. Preferably, the protrusion 210 substantially is disposed corresponding to the middle position between two first slits 112S at the center of the first electrode block 112. Besides, another protrusion (not illustrated) can be disposed on the second substrate 200 corresponding to the middle position between two second slits at the center of the second electrode block 114.

Figure 4A:
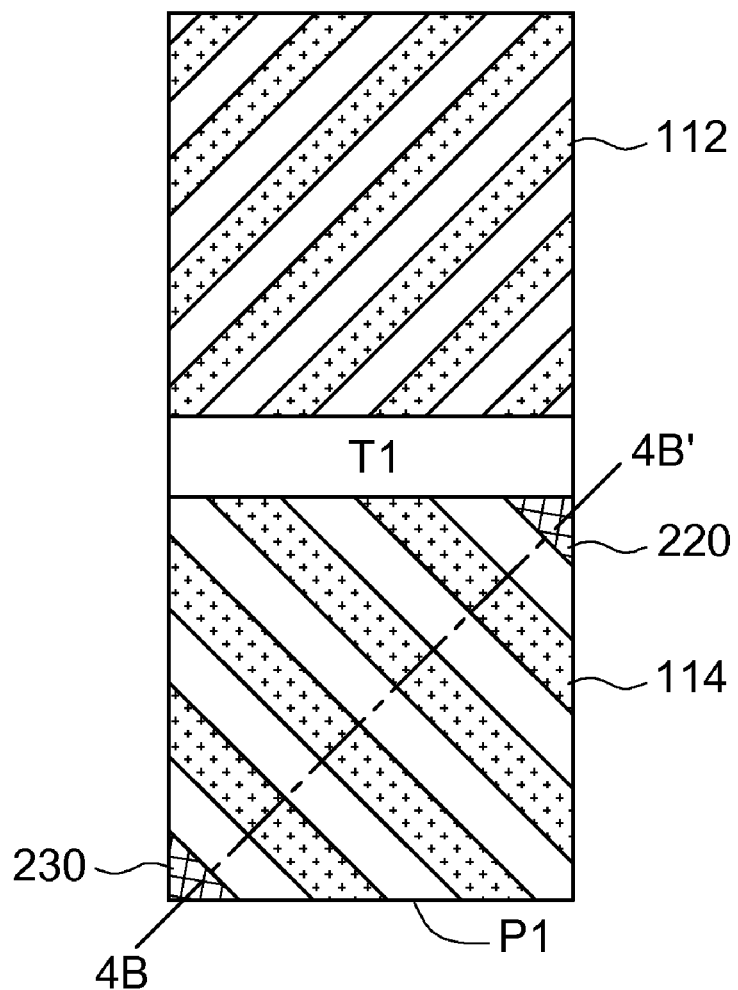
FIG. 4A shows a pixel element disposed with two protrusions.
Figure 4B:
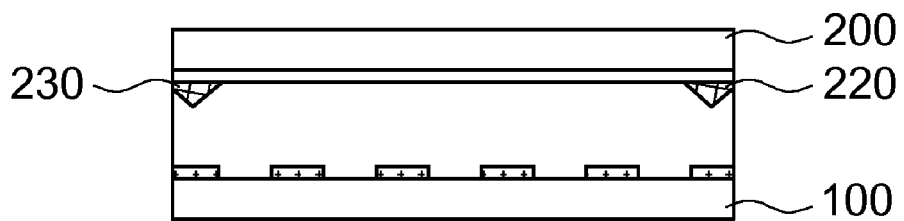
FIG. 4B shows a cross-sectional view of the pixel element of FIG. 4A along a cross-sectional line 4B-4B'.

Refer to FIGS. 4A and 4B. FIG. 4A shows a pixel element disposed with two protrusions. FIG. 4B shows a cross-sectional view of the pixel element of FIG. 4A along a cross-sectional line 4B-4B'. Let the pixel element P1 be taken for example. Two protrusions 220 and 230 can be disposed on the second substrate 200. The two protrusions 220 and 230 correspond to two opposite corners at the edge of the second electrode block 114 to assist the alignment of the liquid crystal molecules at the edge of the display region.

Figure 4C:
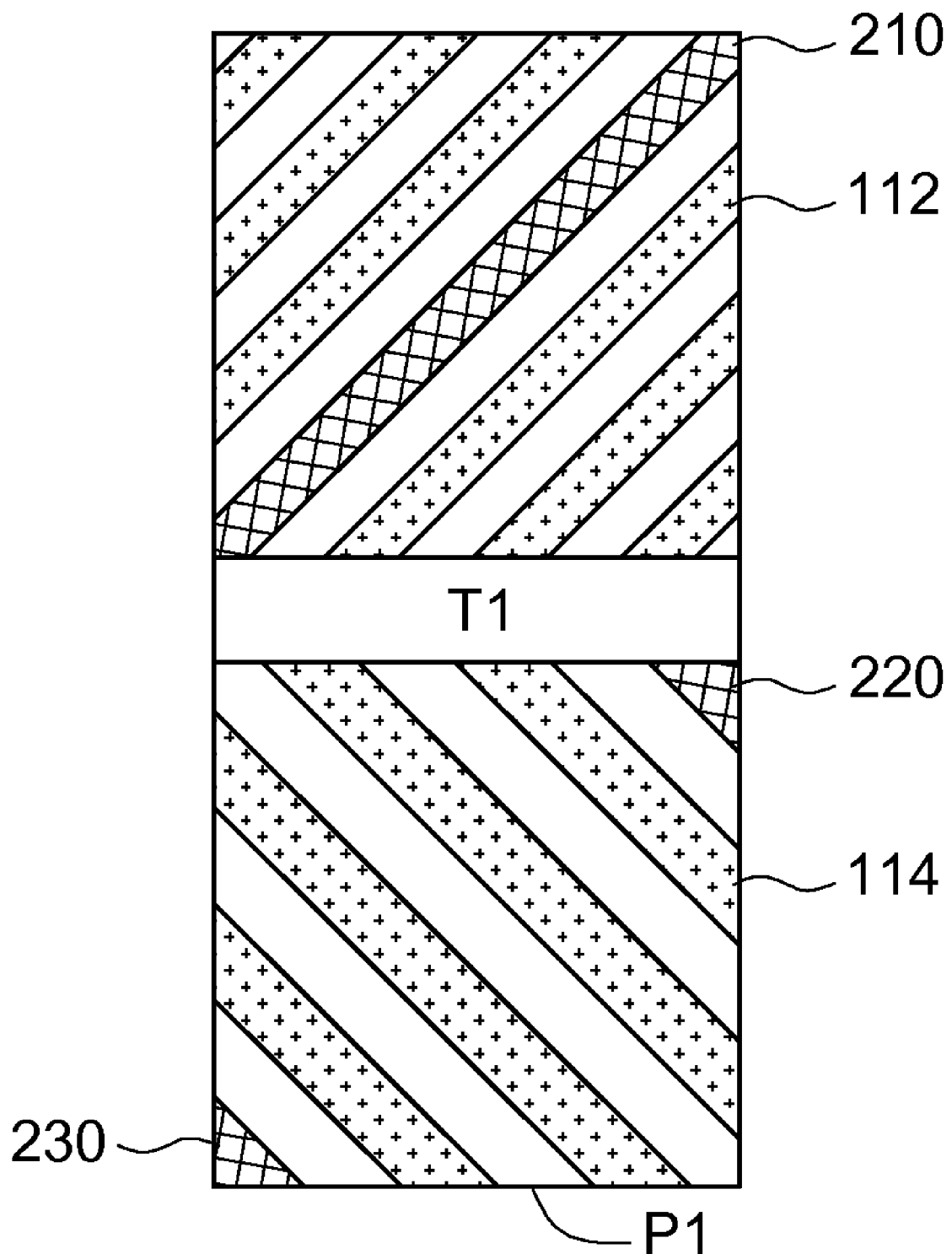
FIG. 4C shows two electrode blocks of a pixel element respectively corresponding to at least one protrusion.

FIG. 4C shows two electrode blocks of a pixel element respectively corresponding to at least one protrusion. In FIG. 4C, the above two dispositions of the protrusions are combined. The center of the first electrode block 112 is disposed corresponding to the protrusion 210, and the two corners of the second electrode block 114 are disposed corresponding to the protrusions 220 and 230 respectively.

The width or the interval of the electrode blocks within two display regions is adjusted, for example, the ratio of the width to the interval is adjusted to be about 1:1, and the contained angle formed by the extending direction of the slit and the scan line (or the horizontal axis of the pixel element) is adjusted to be about 45°. The two display regions, when driven by the same driving voltage, have different transmittances due to different designs of width or/and interval, which result in different distributions of the electrical field lines within the two pixel regions and cause the liquid crystal director to be inverted. Also, a characteristics curve obtained by comparing a conventional vertical alignment (VA) product is shown.

Figure 5A:
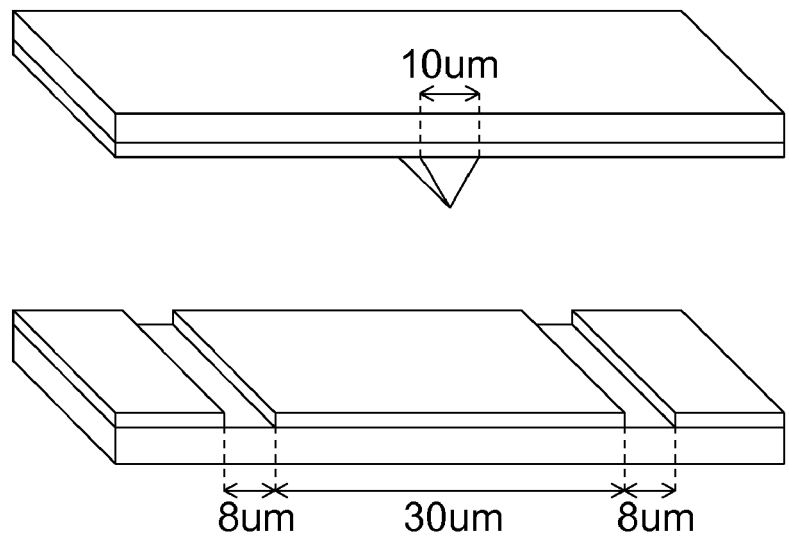
FIG. 5A shows a 3-D diagram of a conventional vertical alignment product.
Figure 5B:
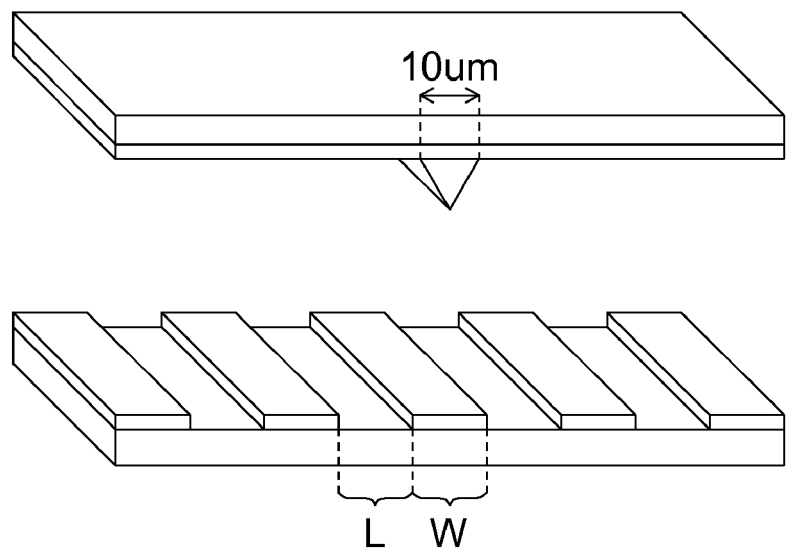
FIG. 5B shows a 3-D diagram of one single protrusion disposed with slits according to an embodiment of the invention.
Figure 6A:
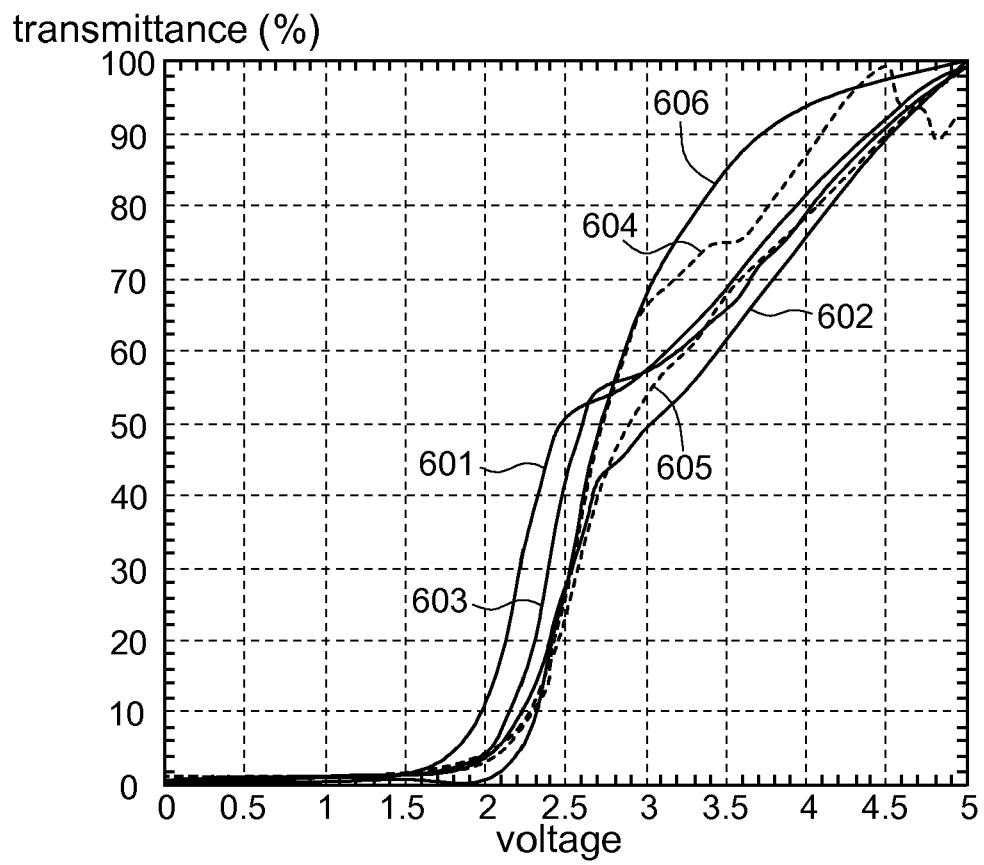
FIG. 6A shows voltage vs. transmittance (V-T) characteristics curves of a single-protrusion design of the embodiment obtained from a view angle of 60°.
Figure 6B:
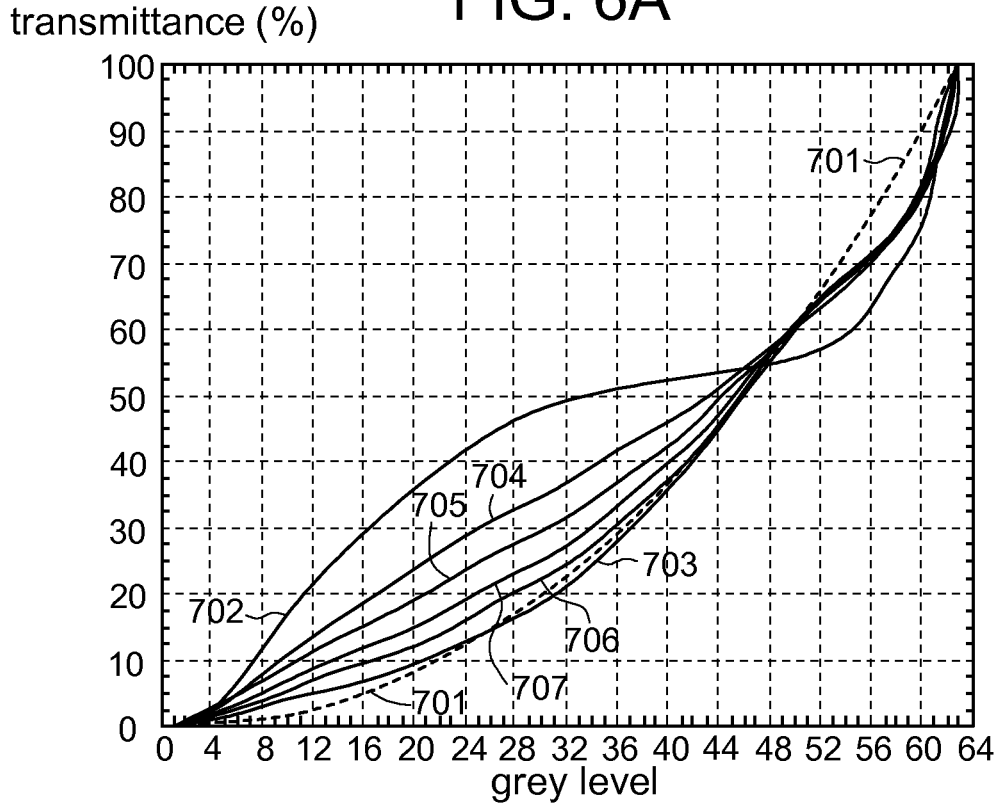
FIG. 6B shows gamma curves of a single-protrusion design obtained from a view angle of 60°.

Refer to FIGS. 5A and 5B. FIG. 5A s shows a 3-D diagram of a conventional vertical alignment product. FIG. 5B shows a 3-D diagram of one single protrusion disposed with slits according to an embodiment of the invention. Also refer to FIGS. 6A and 6B. FIG. 6A shows voltage vs. transmittance (V-T) characteristics curves of a single-protrusion design of the embodiment obtained from a view angle of 60°. FIG. 6B shows gamma curves of a single-protrusion design obtained from a view angle of 60°. Under the circumstances that only one protrusion is disposed, the V-T characteristics curves obtained when the width W and the interval L both are 1, 3, 4, 5 μm and V-T characteristics curves of a conventional VA product obtained from the view angles of 0° and 60° are recorded in FIG. 6A. As indicated in FIG. 5A, the protrusions and the slits of a conventional VA product disposed at the top and the bottom substrates are one-to-one paired, wherein the width of the protrusions is about 10 μm, the dimension of the slit is about 8 μm, and the electrode width between the slits is about 30 μm. In FIG. 6A, the curve 601 is the V-T characteristics curve of the conventional VA product obtained from 60°, the curves 602~605 are the V-T characteristics curves obtained from 60° when the width W and the interval L both are 1, 3, 4, 5 μm, the curve 606 is the V-T characteristics curve of the conventional VA product obtained from 0°. In FIG. 6B, the curve 701 is the curve of gamma value 2.2, the curve 702 is the gamma curve of the conventional VA product obtained from 60°, the curve 703 is the gamma curve based on the V-T characteristics curve obtained when both the width W and the interval L are 4 μm, and the curves 704~707 are further disclosed below.

As indicated in FIG. 6A, when the width W and the interval L both are 4 μm, the V-T characteristics curve 604 obtained from the view angle of 60° is similar to the curve 606 obtained from the view angle of 0°. In FIG. 6B, the curve 702 is the gamma curve of the conventional VA product obtained from 60°, the curve 703 is the gamma curve obtained according to the V-T characteristics curve whose width W and interval L both are 4 μm, and the curves 704~707 are the gamma curves obtained by overlapping the areas of the electrode blocks of the above two curves 702 and 703 when the ratios of the curve 702 to the curve 703 are 1:1, 1:2, 3:7, and 2:8, respectively. By overlapping the gamma curve above the gamma curve of 2.2 and the gamma curve below the gamma curve of 2.2, a new gamma curve closer the gamma curve of 2.2 is generated. As indicated in FIG. 6B, compared with the gamma curve 702 of the conventional VA product, the curves 704~707 obtained by overlapping are closer to the gamma curve 701 of 2.2. Besides, the curve obtained from the design disclosed in the present embodiment of the invention is similar to the curve 703 of FIG. 6B, and is very close to the curve 701 of 2.2. That is, according to the design of the present embodiment of the invention, the gamma curve obtained from a large view angle is close to the gamma curve obtained from an on-axis angle. Thus, by adjusting the width W or/and the interval L within two display blocks, controlling the ratio of the area of the pixel block, and adopting the design of one single protrusion, the design of the present embodiment of the invention indeed largely reduces the color washout of the conventional VA product.

Figure 7A:
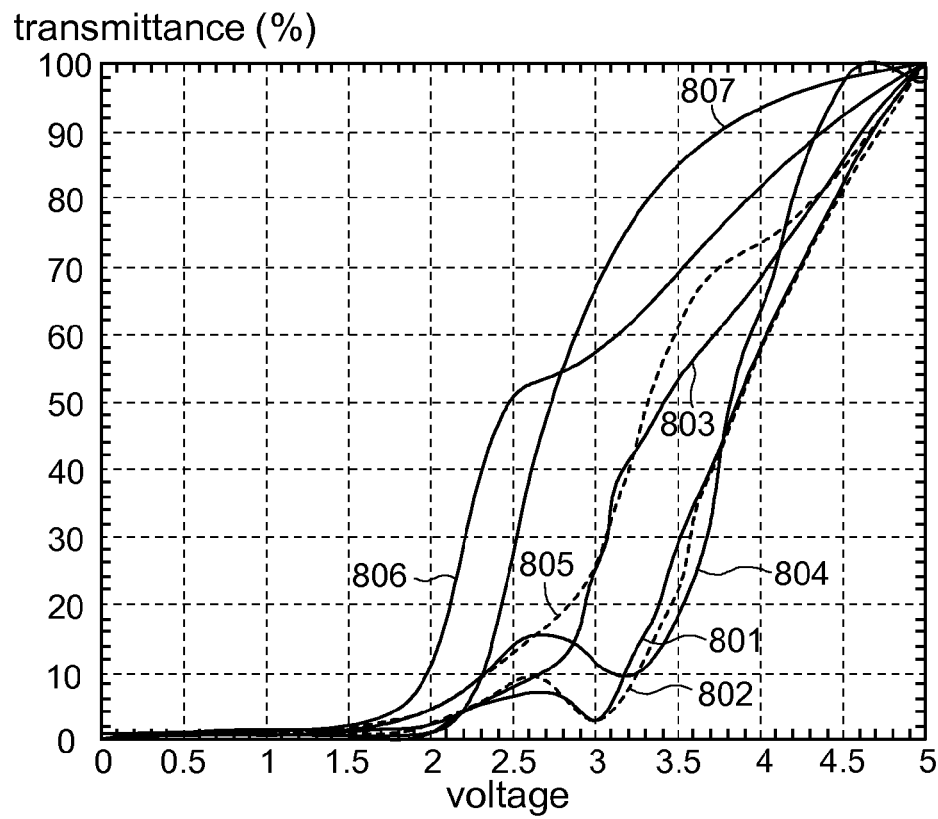
FIG. 7A shows V-T characteristics curves of a two-protrusion design of the embodiment obtained from a view angle of 60°.
Figure 7B:
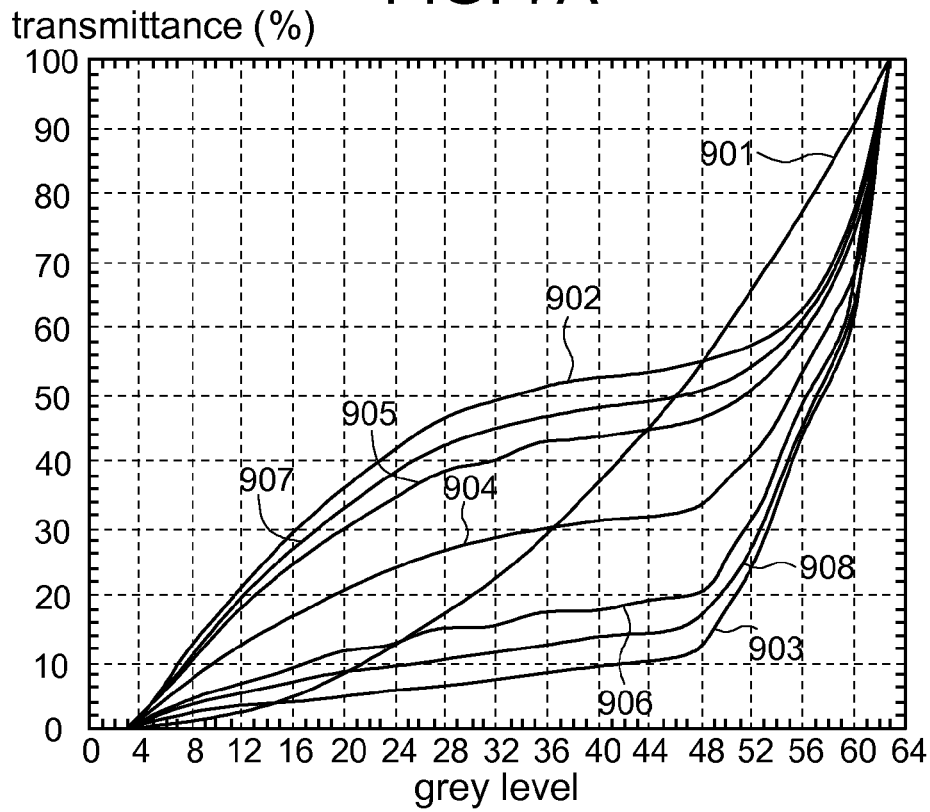
FIG. 7B shows gamma curves of a two-protrusion design obtained from a view angle of 60°.

FIG. 7A shows V-T characteristics curves of a two-protrusion design of the embodiment obtained from a view angle of 60°. FIG. 7B shows gamma curves of a two-protrusion design obtained from a view angle of 60°. Under the circumstances that two protrusions are disposed, the V-T characteristics curves obtained when the width W and the interval L both are 0.5, 1, 3, 4, 5 μm (corresponding to gamma curves 801~805 respectively) and the V-T characteristics curve (the gamma curve 806) of the conventional VA product obtained from the view angles of 0° and 60° are recorded in FIG. 7A. As indicated in FIG. 7A, when the width and the interval both are 3 μm, the V-T characteristics curve 803 obtained from a view angle of 60° is approximately symmetric to the V-T characteristics curve 806 of the conventional VA product obtained from a view angle of 60°. FIG. 7B shows gamma curves obtained according to the V-T characteristics curve (curve 803) whose width and interval both are 3 μm. The curve 901 is a gamma curve of gamma value 2.2. The curve 902 is the gamma curve of the conventional VA product obtained from a view angle of 60°. The curve 903 is the gamma curve obtained according to the V-T characteristics curve whose width and interval are both 3 μm. The curves 904~908 are the gamma curves obtained by overlapping the areas of electrode blocks of the above two curves 902 and 903 when the ratios of areas of the curve 902 to the curve 903 are 1:1, 8:2, 2:8, 9:1 and 1:9. In FIG. 7B, the curve 903 is most close to the right-bottom part of the diagram. After overlapping, compared with the gamma curve 902 of the conventional VA product with a large view angle, the curves 904~908 obtained by overlapping are closer to the gamma curve 901 of 2.2. Thus, by adjusting the width W or the interval L within two display regions, controlling the ratio of the area of the electrode block, and adopting the design of two protrusions, the design of the present embodiment of the invention as well largely reduces the color washout of the conventional VA product.

The LCD panel 10 of the present embodiment of the invention used in an LCD device uses a light source provided by a light source module of the LCD device for display purpose. According to the present embodiment of the invention, each pixel element is divided into two display regions, and the width or/and the interval of the pixel electrode within the two display regions is adjusted. Thus, the LCD panel 10 of the present embodiment of the invention is capable of resolving the color washout problem which occurs to a conventional VA product at a large view angle and improving the display quality no matter the LCD panel 10 of the present embodiment of the invention is incorporated with a single-protrusion design or a two-protrusion design. As only the structure of the pixel electrode is changed, no extra manufacturing process or cost will incur, and the original sequence of manufacturing process will not be changed either. Moreover, the electrode blocks within two display regions are controlled by the same TFT, so no extra TFT is required, and the aperture rate is not affected.

In the present embodiment of the invention, the first substrate and the second substrate of the LCD panel 10 of are respectively exemplified by a TFT substrate and a color filter substrate. However, the invention is not limited thereto. The pixel electrode and the structure thereof can also be used in other types of LCD panel. Any designs, which divide a single pixel element into two display regions, adjust the transmittances of the two display regions by making the electrode blocks within two display regions have different width or/and interval, and control the ratio of the area of the electrode block, so that the gamma curve obtained from a large view angle is close to the gamma curve of 2.2 obtained from an on-axis angle, are within the scope of protection of the invention.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A color washout reducing liquid crystal display (LCD) panel, comprising:
   a first substrate comprising a plurality of thin film transistors (TFTs) arranged in an array, wherein each TFT is disposed corresponding to a pixel element of the LCD panel, and in each pixel element, the first substrate further comprises a pixel electrode electrically connected to the TFT of the pixel element, the pixel electrode comprises:
      a first electrode block having a plurality of first slits, wherein a first interval of the first electrode block is perpendicular to the first slits, and a first width of the first electrode block is between any two neighboring first slits; and
      a second electrode block having a plurality of second slits, wherein a second interval of the second electrode block is perpendicular to the second slits, a second width of the second electrode block is between any two neighboring second slit, and the second interval is not equal to the first interval;
   a second substrate substantially disposed in parallel with the first substrate, wherein the second substrate has a plurality of alignment structures disposed on a surface of the second substrate facing the first substrate, and each pixel element corresponds to at least one alignment structure, and the alignment structures are selected from protrusion and electrode slit; and
   a liquid crystal layer sealed between the first substrate and the second substrate.

2. The LCD panel according to claim 1, wherein the first width is not equal to the second width.

3. The LCD panel according to claim 1, wherein the first electrode block of the pixel electrode of a pixel element is disposed corresponding to the second electrode block of the pixel electrode of a neighboring pixel element.

4. The LCD panel according to claim 3, wherein the pixel elements are located at the same row or the same column.

5. The LCD panel according to claim 1, wherein the first electrode block of the pixel electrode of each pixel element corresponds to an alignment structure that corresponds to the middle position between two first slits at the center of the first electrode block.

6. The LCD panel according to claim 5, wherein the second electrode block of the pixel electrode of each pixel element corresponds to another alignment structure that corresponds to the middle position between two second slits at the center of the second electrode block.

7. The LCD panel according to claim 1, wherein the first electrode block of the pixel electrode of each pixel element corresponds to two alignment structures, and the contour of the first electrode block has two opposite first corners, and the two alignment structures correspond to the two opposite first corners respectively.

8. The LCD panel according to claim 7, wherein the second electrode block of the pixel electrode of each pixel element corresponds to another two alignment structures, and the contour of the second electrode block has two opposite second corners, the two alignment structures corresponds to the two opposite second corners.

9. An LCD device, comprising:
   an LCD panel, comprising:
      a first substrate comprising a plurality of thin film transistors (TFTs) arranged in an array, each TFT is disposed corresponding to a pixel element of the LCD panel, and in each pixel element, the first substrate further comprises a pixel electrode electrically connected to the TFT of pixel element, and the pixel electrode has:
         a first electrode block having a plurality of first slits, wherein a first interval of the first electrode block is perpendicular to the first slits, and a first width of the first electrode block is between any two neighboring first slits; and
         a second electrode block having a plurality of second slits, wherein a second interval of the second electrode block is perpendicular to the second slits, and the second electrode block has a second width between any two neighboring second slit, and the second interval is not equal to the first interval;
      a second substrate substantially disposed in parallel with the first substrate, wherein the second substrate has a plurality of alignment structures disposed on a surface of the second substrate facing the first substrate, and each pixel element corresponds to at least one alignment structure, and the alignment structures are selected from protrusion and electrode slit; and
      a liquid crystal layer sealed between the first substrate and the second substrate; and
   a light source module used for providing the light source to the LCD panel.

10. The LCD device according to claim 9, wherein the first width is not equal to the second width.

11. The LCD device according to claim 9, wherein the first electrode block of the pixel electrode of a pixel element is disposed corresponding to the second electrode block of the pixel electrode of a neighboring pixel element.

12. The LCD device according to claim 11, wherein the pixel elements are located at the same row or the same column.

13. The LCD device according to claim 9, wherein the first electrode block of the pixel electrode of each pixel element corresponds to an alignment structure that corresponds to the middle position between two first slits at the center of the first electrode block.

14. The LCD device according to claim 13, wherein the second electrode block of the pixel electrode of each pixel element corresponds to another alignment structure that corresponds to the middle position between two second slits at the center of the second electrode block.

15. The LCD device according to claim 9, wherein the first electrode block of the pixel electrode of each pixel element corresponds to two alignment structures, and the contour of the first electrode block has two opposite corners, and the two alignment structures correspond to the two opposite corners respectively.

16. The LCD device according to claim 15, wherein the second electrode block of the pixel electrode of each pixel element corresponds to another two alignment structures, and the contour of the second electrode block has two opposite corners, and the two alignment structures correspond to the two opposite corners.

* * * * *